US012424141B2

(12) United States Patent
Feng et al.

(10) Patent No.: US 12,424,141 B2
(45) Date of Patent: Sep. 23, 2025

(54) BRIGHTNESS ADJUSTMENT METHOD, BRIGHTNESS ADJUSTMENT DEVICE AND DISPLAY DEVICE

(71) Applicant: BOE TECHNOLOGY GROUP CO., LTD., Beijing (CN)

(72) Inventors: Yilin Feng, Beijing (CN); Zhaohui Meng, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/021,228

(22) PCT Filed: Jan. 29, 2022

(86) PCT No.: PCT/CN2022/075048

§ 371 (c)(1),
(2) Date: Feb. 14, 2023

(87) PCT Pub. No.: WO2023/142057

PCT Pub. Date: Aug. 3, 2023

(65) Prior Publication Data

US 2024/0265842 A1 Aug. 8, 2024

(51) Int. Cl.
*G09G 3/20* (2006.01)

(52) U.S. Cl.
CPC ... *G09G 3/2092* (2013.01); *G09G 2320/0233* (2013.01); *G09G 2320/0257* (2013.01);
(Continued)

(58) Field of Classification Search
None
See application file for complete search history.

(56) References Cited

U.S. PATENT DOCUMENTS

2016/0189656 A1* 6/2016 Park ........................ G09G 3/006
345/694
2018/0336855 A1* 11/2018 He ........................ G09G 3/2007
(Continued)

*Primary Examiner* — Benjamin C Lee
*Assistant Examiner* — Emily J Frank
(74) *Attorney, Agent, or Firm* — WHDA, LLP

(57) ABSTRACT

A brightness adjustment method, a brightness adjustment device and a display device are provided. The brightness adjustment method includes: dividing into M first regions in accordance with a distribution state of common voltages $V_{com}$, a difference between the common voltages $V_{com}$ in different first regions being greater than a first threshold; dividing into N second regions in accordance with a distribution state of pixel voltages $V_{pixel}$, a difference between the pixel voltages $V_{pixel}$ in different second regions being greater than a second threshold; calculating a voltage compensation value in each first region; calculating a voltage compensation value in each second region; overlapping the M first regions and the N second regions to obtain M*N adjustment regions; calculating gamma voltages at different grayscales in each adjustment region to obtain a set of gamma data about the M*N adjustment regions; driving a display module to display in accordance with the gamma data.

15 Claims, 4 Drawing Sheets

(52) U.S. Cl.
CPC ............... *G09G 2320/0271* (2013.01); *G09G 2360/144* (2013.01); *G09G 2360/16* (2013.01)

(56) References Cited

U.S. PATENT DOCUMENTS

| | | | | |
|---|---|---|---|---|
| 2019/0080663 | A1* | 3/2019 | Liu | G09G 3/3655 |
| 2022/0045149 | A1* | 2/2022 | Kim | G09G 3/006 |
| 2022/0392416 | A1* | 12/2022 | Xu | G09G 3/36 |
| 2024/0063231 | A1* | 2/2024 | Katsuta | H01L 27/124 |

* cited by examiner

| | | | | | | |
|---|---|---|---|---|---|---|
| 1 | 2 | 3 | 4 | 5 | 6 | 7 |
| 32 | | | | | | 8 |
| 31 | | | | | | 9 |
| 30 | | | | | | 10 |
| 29 | | | | | | 11 |
| 28 | | | | | | 12 |
| 27 | | | | | | 13 |
| 26 | | | | | | 14 |
| 25 | | | | | | 15 |
| 24 | | | | | | 16 |
| 23 | 22 | 21 | 20 | 19 | 18 | 17 |

Fig. 7

BRIGHTNESS ADJUSTMENT METHOD, BRIGHTNESS ADJUSTMENT DEVICE AND DISPLAY DEVICE

CROSS-REFERENCE TO RELATED APPLICATION

The present application is the U.S. national phase of PCT Application No. PCT/CN2022/075048 filed on Jan. 29, 2022, which is incorporated herein by reference in its entirety.

TECHNICAL FIELD

The present disclosure relates to the field of display technology, in particular to a brightness adjustment method, a brightness adjustment device, and a display device.

BACKGROUND

Sensitivity of human eyes to a change in brightness of an image is associated with the brightness of the image, and the human eyes are most sensitive to the change in the brightness of the image in the case that the image has low brightness. For liquid crystal display, as a digital-driving technology, the brightness of the image is divided into multiple grayscales. In order to enable a relationship between the digitized grayscales and the change in the brightness sensed by the human eyes to be a linear one, a gamma voltage is introduced. In the related art, gamma data is pre-stored in a display device, and the brightness adjustment is performed on a region basis in accordance with the stored gamma data.

When an image is displayed by a liquid crystal display device for a long time period and then a next image is displayed, the previous image may remain in the next image, and this phenomenon is call as afterimage (also called as image sticking). Especially, when brightness unevenness is caused due to insufficient $V_{pixel}$ (pixel voltage) and uneven $V_{com}$ (common voltage) at some regions, the afterimage occurs seriously.

SUMMARY

An object of the present disclosure is to provide a brightness adjustment method, a brightness adjustment device and a display device, so as to provide an image with even brightness, thereby to prevent the occurrence of afterimages due to an insufficient pixel voltage and an uneven common voltage.

The present disclosure provides the following technical solutions.

In one aspect, the present disclosure provides in some embodiments a brightness adjustment method, including: dividing a currently displaying image into M first regions in accordance with a distribution state of common voltages $V_{com}$ in the currently displaying image, a difference between the common voltages $V_{com}$ in different first regions being greater than a first threshold, M being an integer greater than 1; dividing the currently displaying image into N second regions in accordance with a distribution state of pixel voltages $V_{pixel}$ in the currently displaying image, a difference between the pixel voltages $V_{pixel}$ in different second regions being greater than a second threshold, N being an integer greater than 1; calculating a voltage compensation value in each first region, a voltage compensation value in an $m^{th}$ first region being $\Delta V_m$, m being an integer within a range of 1 to M; calculating a voltage compensation value in each second region, a voltage compensation value in an $n^{th}$ second region being $\Delta V_n$, n being an integer within a range of 1 to N; overlapping the M first regions and the N second regions to obtain M*N adjustment regions; calculating gamma voltages at different grayscales in each adjustment region to obtain a set of gamma data about the M*N adjustment regions, a gamma voltage in an adjustment region obtained through overlapping the $m^{th}$ first region and the $n^{th}$ second region being $V+\Delta V_m+\Delta V_n$, V being a grayscale voltage at a current grayscale; and driving a display module to display in accordance with the gamma data.

In a possible embodiment of the present disclosure, the voltage compensation value $\Delta V_m$ in the ma first region is calculated through $\Delta V_m=V_m-V_p$ (I), where $V_p$ represents an average value of the common voltages $V_{com}$ in the M first regions, and $V_m$ represents a value of the common voltage $V_{com}$ in the $m^{th}$ first region.

In a possible embodiment of the present disclosure, the voltage compensation value $\Delta V_n$ in the $n^{th}$ second region is calculated through $\Delta V_n=V_n-V_p'$ (II), where $V_p'$ represents an average value of the pixel voltages $V_{pixel}$ in the N second regions, and $V_n$ represents a value of the pixel voltage $V_{pixel}$ din the $n^{th}$ second region.

In a possible embodiment of the present disclosure, prior to dividing the currently displaying image into the M first regions in accordance with the distribution state of the common voltages $V_{com}$ in the currently displaying image, the brightness adjustment method further includes: detecting ambient brightness values at different positions in the currently displaying image; querying a pre-stored look-up table to determine voltage compensation values at different positions, the look-up table including a correspondence between the ambient brightness values and the voltage compensation values; and determining the distribution states of the common voltages $V_{com}$ and the pixel voltages $V_{pixel}$ in the currently displaying image in accordance with a correspondence between the voltage compensation values at different positions in the currently displaying image and corresponding positions.

In a possible embodiment of the present disclosure, prior to querying the pre-stored look-up table, the brightness adjustment method further includes obtaining the look-up table. The obtaining the look-up table includes: detecting ambient brightness values at different positions in a test image; calculating an average value of the ambient brightness values of the test image as a brightness reference; and calculating a difference between the ambient brightness value at each position in the test image and the brightness reference, and determining a voltage compensation value corresponding to each ambient brightness value in accordance with the difference, so as to obtain the look-up table.

In a possible embodiment of the present disclosure, the detecting the ambient brightness values at different positions in the test image includes dividing the test image into a plurality of sub-regions arranged in an array of L rows and D columns, L and D each being a positive integer greater than or equal to 1, and providing light-sensitive sensors in the sub-regions in a first row, the sub-regions in an $L^{th}$ row, the sub-regions in a first column and the sub-regions in a $D^{th}$ column in the plurality of sub-regions so as to obtain the ambient brightness values at different positions in the test image; and/or the detecting the ambient brightness values at different positions in the currently displaying image includes dividing the currently displaying image into a plurality of sub-regions arranged in an array of L rows and D columns, L and D each being a positive integer greater than or equal to 1, and providing light-sensitive sensors in the sub-regions in a first row, the sub-regions in an $L^{th}$ row, the sub-regions in a first column and the sub-regions in a DA column in the plurality of sub-regions so as to obtain the ambient brightness values at different positions in the currently displaying image.

In another aspect, the present disclosure provides in some embodiments a brightness adjustment device, including: a first division module configured to divide a currently displaying image into M first regions in accordance with a distribution state of common voltages $V_{com}$ in the currently displaying image, a difference between the common voltages $V_{com}$ in different first regions being greater than a first threshold, M being an integer greater than 1; a second division module configured to divide the currently displaying image into N second regions in accordance with a distribution state of pixel voltages $V_{pixel}$ in the currently displaying image, a difference between the pixel voltages $V_{pixel}$ in different second regions being greater than a second threshold, N being an integer greater than 1; a first calculation module configured to calculate a voltage compensation value in each first region, a voltage compensation value in an m& first region being $\Delta V_m$, m being an integer within a range of 1 to M; a second calculation module configured to calculate a voltage compensation value in each second region, a voltage compensation value in an $n^{th}$ second region being $\Delta V_n$, n being an integer within a range of 1 to N; a third division module configured to overlap the M first regions and the N second regions to obtain M*N adjustment regions; a third calculation module configured to calculate gamma voltages at different grayscales in each adjustment region to obtain a set of gamma data about the M*N adjustment regions, a gamma voltage in an adjustment region obtained through overlapping the $m^{th}$ first region and the $n^{th}$ second region being $V+\Delta V_m+\Delta V_n$, V being a grayscale voltage at a current grayscale; and a driving module configured to drive a display module to display in accordance with the gamma data.

In a possible embodiment of the present disclosure, the first calculation module is specifically configured to calculate the voltage compensation value $\Delta V_m$ in the $m^{th}$ first region through $\Delta V_m=V_m-V_p$ (I), where $V_p$ represents an average value of the common voltages $V_{com}$ in the M first regions, and $V_m$ represents a value of the common voltage $V_{com}$ in the $m^{th}$ first region.

In a possible embodiment of the present disclosure, the second calculation module is specifically configured to calculate the voltage compensation value $\Delta V_n$ in the $n^{th}$ second region through $\Delta V_n=V_n-V_p'$ (II), where $V_p'$ represents an average value of the pixel voltages $V_{pixel}$ in the N second regions, and $V_n$ represents a value of the pixel voltage $V_{pixel}$ in the $n^{th}$ second region.

In a possible embodiment of the present disclosure, the brightness adjustment device further includes: light-sensitive sensors configured to detect ambient brightness values at different positions in the currently displaying image; a querying module configured to query a pre-stored look-up table to determine voltage compensation values at different positions, the look-up table including a correspondence between the ambient brightness values and the voltage compensation values; and a determination module configured to determine the distribution states of the common voltages $V_{com}$ and the pixel voltages $V_{pixel}$ in the currently displaying image in accordance with a correspondence between the voltage compensation values at different positions in the currently displaying image and corresponding positions.

In a possible embodiment of the present disclosure, the brightness adjustment device further includes an obtaining module configured to obtain the correspondence. The obtaining module specifically includes: a reception unit configured to detect ambient brightness values at different positions in a test image; a first calculation unit configured to calculate an average value of the ambient brightness values of the test image as a brightness reference; a second calculation unit configured to calculate a difference between the ambient brightness value at each position in the test image and the brightness reference; and a data processing unit configured to determine a voltage compensation value corresponding to each ambient brightness value in accordance with the difference, so as to obtain the look-up table.

In a possible embodiment of the present disclosure, the light-sensitive sensor is integrated in the display module, an image displayed by the display module is divided into a plurality of sub-regions arranged in an array of L rows and D columns, each of L and D is a positive integer greater than or equal to 1. The light-sensitive sensors are provided in the sub-regions in a first row, the sub-regions in an $L^{th}$ row, the sub-regions in a first column and the sub-regions in a $D^{th}$ column in the plurality of sub-regions.

In yet another aspect, the present disclosure provides in some embodiments a display device including the above-mentioned brightness adjustment device.

The present disclosure has the following beneficial effects.

According to the brightness adjustment method, the brightness adjustment device and the display device in the embodiments of the present disclosure, simulation gamma adjustment is performed on a region basis through overlapping the regions, i.e., the regions are divided in accordance with the change in the common voltages $V_{com}$ in different regions and the change in the pixel voltages $V_{pixel}$ in different regions in the image, so as to adjust the simulation gamma values. As a result, it is able to provide the image with even brightness in different regions, and adjust the gamma values within a relatively large range, thereby to prevent the occurrence of the afterimage due to an insufficient pixel voltage and an uneven common voltage.

BRIEF DESCRIPTION OF THE DRAWINGS

FIG. 7 is a schematic view showing the arrangement of the light-sensitive sensors in a large-size display module according to some embodiments of the present disclosure.

DETAILED DESCRIPTION

Figure 1:
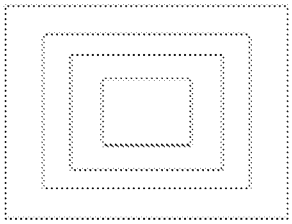
FIG. 1 is a schematic view showing a distribution state of common voltages $V_{com}$ in some display modules, where each solid line represents a $V_{com}$ isopotential line.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Before describing the schemes of the embodiments of the present disclosure in details, the following description about the related art will be given at first.

In the related art, gamma data is pre-stored in a display device, and the dividing of the regions may be adjusted in accordance with the stored gamma data during the brightness adjustment. Regions adopted during the gamma adjustment are digital gamma regions, and a resultant brightness adjustment effect of an image is relatively weak. When an image is displayed by a liquid crystal display device for a long time period and then a next image is displayed, the previous image may remain in the next image, and this phenomenon is call as afterimage (also called as image sticking). Especially, when brightness unevenness is caused due to insufficient $V_{pixel}$ (pixel voltage) and uneven $V_{com}$ (common voltage) at some regions, the afterimage occurs seriously.

In view of the above, an object of the present disclosure is to provide a brightness adjustment method, a brightness adjustment device and a display device, so as to provide an image with even brightness in different regions, and adjust the brightness within a relatively large range, thereby to prevent the occurrence of the afterimage due to an insufficient pixel voltage and an uneven common voltage.

In this application, it is found through researches that, for a display module, the common voltage $V_{com}$ and the pixel voltage $V_{pixel}$ change in different ways for an image.

Figure 2:
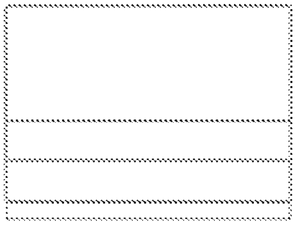
FIG. 2 is a schematic view showing a distribution state of pixel voltages $V_{pixel}$ in some display modules, where each solid line represents a $V_{pixel}$ isopotential line.

FIG. 1 shows a voltage distribution state of the common voltages $V_{com}$ (i.e., the change in the common voltages $V_{com}$) in some display modules, where each solid line is a $V_{com}$ isopotential line. FIG. 2 shows a voltage distribution state of the pixel voltages $V_{pixel}$ (i.e., the change in the pixel voltages $V_{pixel}$) in some display modules, where each solid line is a $V_{pixel}$ isopotential line.

As shown in FIG. 1, for the voltage distribution state of the common voltages $V_{com}$, the closer to the center, the larger the difference between $V_{com}$ and a target value. As shown in FIG. 2, for the pixel voltages $V_{pixel}$, the regions defined by the solid lines indicate different charging effects of $V_{pixel}$, and the voltages approximately change from a proximal end to a distal end of the display module gradually. Hence, the gamma values at different regions are different due to the change in the common voltages $V_{com}$ and the change in the pixel voltages $V_{pixel}$.

In the related art, the digital gamma regions are adopted, and the region-based compensation is performed through querying a table in accordance with red (R), green (G) and blue (B) grayscale values of an inputted image. The compensation is performed in accordance with a theoretical value, and it is digital compensation, so the compensation effect is not obvious, i.e., the brightness adjustment effect of the image is relatively weak. Due to uneven charging, the $V_{com}$ deviation occurs at some regions, leading to uneven brightness, especially a serious afterimage.

In the embodiments of the present disclosure, gamma regions are provided in an overlapping manner, so as to improve the brightness evenness at different regions and adjust the brightness within a relatively large range, thereby to prevent the occurrence of afterimages.

Figure 8:
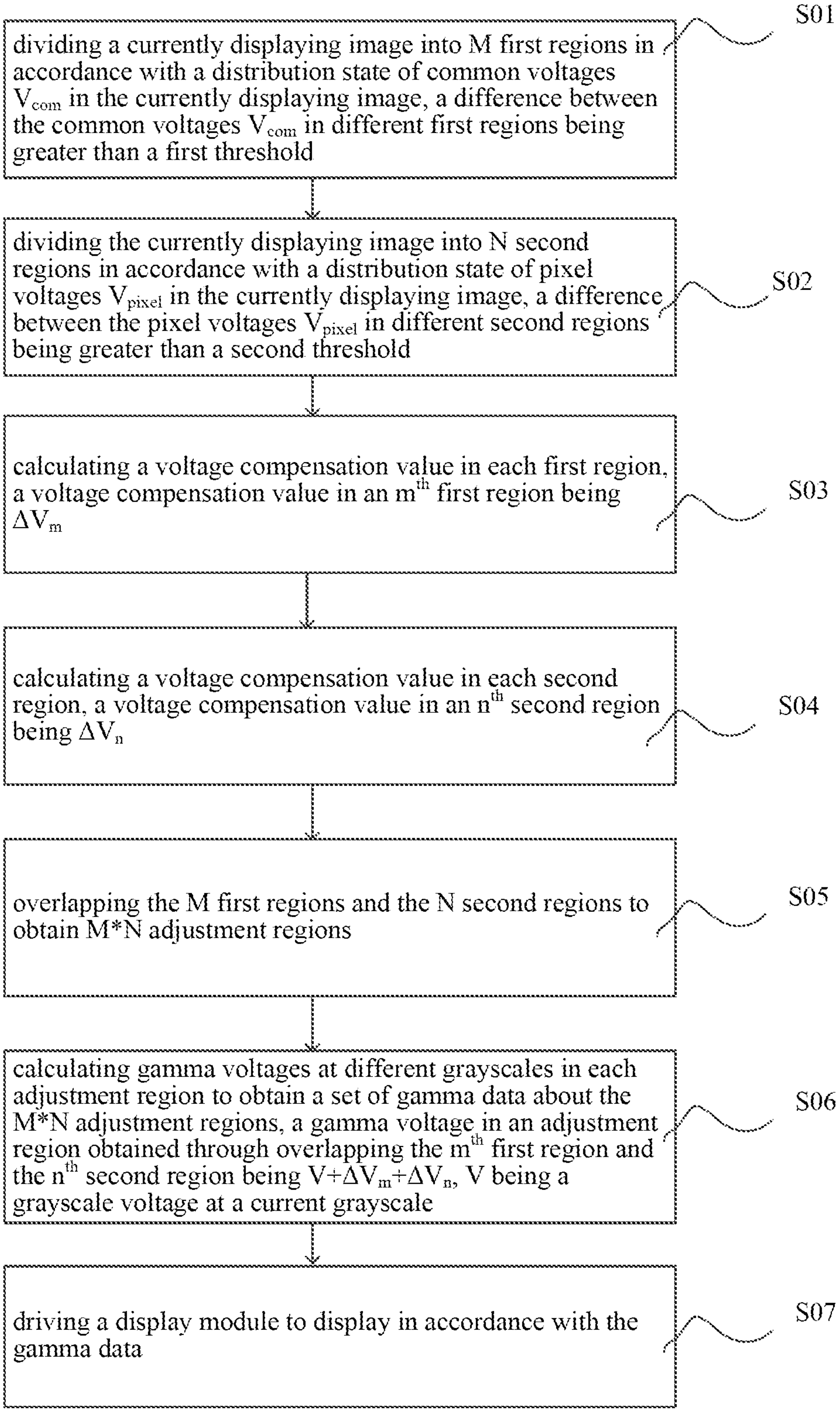
FIG. 8 is a flow chart of a brightness adjustment method according to some embodiments of the present disclosure.

As shown in FIG. 8, the present disclosure provides in some embodiments a brightness adjustment method, which includes: Step S01 of dividing a currently displaying image into M first regions in accordance with a distribution state of common voltages $V_{com}$ in the currently displaying image, a difference between the common voltages $V_{com}$ in different first regions being greater than a first threshold, M being an integer greater than 1; Step S02 of dividing the currently displaying image into N second regions in accordance with a distribution state of pixel voltages $V_{pixel}$ in the currently displaying image, a difference between the pixel voltages $V_{pixel}$ in different second regions being greater than a second threshold, N being an integer greater than 1; Step S03 of calculating a voltage compensation value in each first region, a voltage compensation value in an $m^{th}$ first region being $\Delta V_m$, m being an integer within a range of 1 to M; Step S04 of calculating a voltage compensation value in each second region, a voltage compensation value in an $n^{th}$ second region being $\Delta V_n$, n being an integer within a range of 1 to N; Step S05 of overlapping the M first regions and the N second regions to obtain M*N adjustment regions; Step S06 of calculating gamma voltages at different grayscales in each adjustment region to obtain a set of gamma data about the M*N adjustment regions, a gamma voltage in an adjustment region obtained through overlapping the $m^{th}$ first region and the $n^{th}$ second region being $V+\Delta V_m+\Delta V_n$, V being a grayscale voltage at a current grayscale; and Step S07 of driving a display module to display in accordance with the gamma data.

Based on the above, in contrast to the related art where the digital gamma regions are adopted, in the embodiments of the present disclosure, the regions are provided in an overlapping manner, i.e., the gamma regions are provided in accordance with a change in the common voltages and a change in the pixel voltages. As a result, it is able to improve the brightness evenness and adjust the brightness within a relatively large range, thereby to prevent the occurrence of afterimages due to the insufficient pixel voltage and the uneven common voltage.

It should be appreciated that, an order of S01 of dividing the image into regions in accordance with the common voltages $V_{com}$ and S02 of dividing the image into regions in accordance with the pixel voltages $V_{pixel}$ is interchangeable, and an order of S03 and S04 is also interchangeable.

In Step S01, the distribution state of the common voltages $V_{com}$ just refers to a change state of the common voltages $V_{com}$. The M first regions are obtained in accordance with the change in the common voltages $V_{com}$. As a principle for dividing the image into the first regions, in a same first region, the common voltages $V_{com}$ are approximately equal to each other or a difference between the common voltages $V_{com}$ is within a predetermined range, and in different first regions, a difference between the common voltages $V_{com}$ is greater than a first threshold. The first threshold is predetermined from experience.

Figure 3:
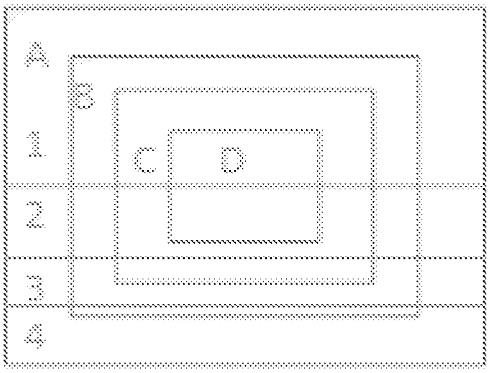
FIG. 3 is a schematic view showing regions divided through a brightness adjustment method according to some embodiments of the present disclosure.

As shown in FIG. 3, M is equal to 4, so the image is divided into four first regions from a center of the image, i.e., regions A, B, C and D. It should be appreciated that, the above is merely for illustrative purposes, and in actual use, the quantity of the first regions may be adjusted as mentioned hereinabove in accordance with the change in the common voltages $V_{com}$ for different display products.

In addition, it should be further appreciated that, in FIG. 3, illustratively, the isopotential lines for defining the regions in accordance with the change in the common voltage $V_{com}$, are arranged regularly from the center. However, for different display products, in actual use, the isopotential lines for defining the regions in accordance with the change in the common voltage $V_{com}$, are unnecessarily arranged as that mentioned hereinabove. For example, different first regions may unnecessarily have a same width, or a same first region may be unnecessarily symmetric relative to the center of the image, or the isopotential line may be unnecessarily a straight line, e.g., it may be an oblique line or an irregular line.

In Step S02, the distribution state of the pixel voltages $V_{pixel}$ just refers to a charging change in the pixel voltages $V_{pixel}$. The N second regions are obtained in accordance with the change in the pixel voltages $V_{pixel}$. As a principle for dividing the image into the second regions, in a same second region, the pixel voltages $V_{pixel}$ are approximately equal to each other or a difference between the pixel voltages $V_{pixel}$ is within a predetermined range, and in different second regions, a difference between the pixel voltages $V_{pixel}$ is greater than a second threshold. The second threshold may be predetermined from experience.

Figure 4:
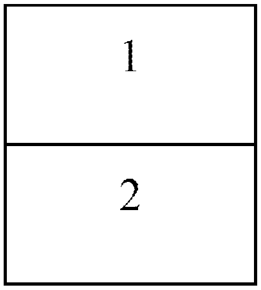
FIG. 4 is a schematic view showing the arrangement of light-sensitive sensors in a small-size display module according to some embodiments of the present disclosure.

As shown in FIG. 4, N is equal to 4, so the image is divided into four second regions from a center of the image. i.e., regions 1, 2, 3 and 4. It should be appreciated that, the above is merely for illustrative purposes, and in actual use, the quantity of the second regions may be adjusted as mentioned hereinabove in accordance with the change in the pixel voltages $V_p$md for different display products.

In addition, it should be further appreciated that, in FIG. 3, illustratively, the isopotential lines for defining the regions in accordance with the change in the pixel voltage $V_{pixel}$ are arranged regularly from a proximal end to a distal end. However, for different display products, in actual use, the isopotential lines for defining the regions in accordance with the change in the pixel voltage $V_{pixel}$ are unnecessarily arranged as that mentioned hereinabove. For example, different second regions may unnecessarily have a same width, or the isopotential line may be unnecessarily a straight line, e.g., it may be an oblique line or an irregular line.

In addition, it should be further appreciated that, in the above description, M=N=4. However, in actual use, values of M and N may be identical to or different from each other. The quantity of the first regions and the quantity of the second regions may be adjusted using the above-mentioned principle in accordance with the change in the common voltages $V_{com}$ and the change in the pixel voltages $V_{pixel}$ for the product.

In Step S05, the M first regions and the N second regions are overlapped to obtain M*N adjustment regions, which are indexed as A1, B1, C1, D1, A2, B2, C2, D2, . . . , mn, . . . , and MN.

In FIG. 3, the four first regions and the four second regions are overlapped to obtain sixteen adjustment regions as shown in Table 1.

TABLE 1

| | $V_{com}$ | | | |
|---|---|---|---|---|
| $V_{pixel}$ | A | B | C | D |
| 1 | A1 | B1 | C1 | D1 |
| 2 | A2 | B2 | C2 | D2 |
| 3 | A3 | B3 | C3 | D3 |
| 4 | A4 | B4 | C4 | D4 |

It should be appreciated that, as shown in FIG. 3, when a first region close to the center does not overlap with a second region close to the proximal end due to small areas of these regions, the actual quantity of adjustment regions might not be M*N. In this regard, however, theoretically, the gamma voltage in the adjustment region where the first region does not overlap with the second region may be considered to be identical to that in the adjacent adjustment region.

For example, taking Table 1 as an example, as shown in FIG. 3, the regions 3 and 4 do not overlap with the region D, i.e., the regions D3 and D4 do not overlap with each other. At this time, the gamma voltage in the region D3 is considered to be identical to that in the adjacent region C3, and the gamma voltage in the region D4 is considered to be identical to that in the adjacent region B4.

In Step S06, when calculating the gamma voltages at different grayscales in the adjustment regions, the gamma voltage at each grayscale in each adjustment region is equal to a sum of a grayscale voltage at a current grayscale, a common voltage compensation value in a first region where the adjustment region is located, and a pixel voltage compensation value in a second region where the adjustment region is located. In other words, the common voltage compensation value in each first region is calculated at first, then the simulation gamma value is adjusted preliminarily in accordance with the charging change in the pixel voltages, and then an adjustment result is fitted with the common voltage compensation value in each first region on a region basis, so as to obtain a set of new gamma values for adjusting the simulation gamma values on a region basis through overlapping the regions.

For example, in FIG. 3, the gamma voltage adjustment is performed in each adjustment region. The image is divided into four first regions A, B, C and D in accordance with the common voltages $V_{com}$ and divided into four second regions 1, 2, 3 and 4 in accordance with the pixel voltages, so as to obtain 16 adjustment regions through overlapping. Taking the region A1 as an example, a $V_{com}$ compensation value $\Delta V_A$ in the region A is determined, and then a charging attenuation degree $\Delta V_s$ of $V_{pixel}$ in the region 1 is determined. At this time, a simulation gamma value at GL255 in the region A1 is $V_{255}+\Delta V_A+\Delta V_s$, and a simulation gamma value at GL0 in the region A1 is $V_0+\Delta V_A+\Delta V_s$. The gamma values in the other fifteen regions may be calculated in a similar way, so as to obtain a set of the simulation gamma data in each adjustment region. In this way, an adjustment range is relatively large, and it is able to perform the brightness adjustment on a panel in accordance with the newly-generated sixteen pairs of simulation gamma values, thereby to improve the brightness evenness.

For example, in Step S03, the voltage compensation value $\Delta V_m$ in the $m^{th}$ first region is calculated through $\Delta V_m = V_m - V_p$ (I), where $V_p$ represents an average value of the common voltages $V_{com}$ in the M first regions, and $V_m$ represents a value of the common voltage $V_{com}$ in the $m^{th}$ first region.

For example, in Step S04, the voltage compensation value $\Delta V_n$ in the $n^{th}$ second region is calculated through $\Delta V_n = V_n - V_p'$ (II), where $V_p'$ represents an average value of the pixel voltages $V_{pixel}$ in the N second regions, and $V_n$ represents a value of the pixel voltage $V_{pixel}$ in the $n^{th}$ second region.

For example, in FIG. 3, an average value $V_p$ of four common voltages $V_A$, $V_B$, $V_C$ and $V_D$ in the regions A, B, C and D is calculated, i.e., $V_p = (V_A + V_B + V_C + V_D)/4$. Next, a difference $\Delta V_A$ in each first region is calculated. Taking the region A as an example, $\Delta V_A = V_A - V_p$, and $\Delta V_A$ is just the common voltage compensation value in the region A. In addition, $\Delta V_B$. $\Delta V_C$ and $\Delta V_D$ in the regions B, C and D are calculated in a similar way. Identically, an average value $V_p'$ of the pixel voltages in the four second regions 1, 2, 3 and 4 is calculated, i.e., $V_p' = (V_1 + V_2 + V_3 + V_4)/4$. Next, a difference $\Delta V_s$ between the average value $V_p$ of four common voltages and the average value $V_p'$ of the pixel voltages in each second region is calculated. Taking the region 1 as an example, $\Delta V_1 = V_1 - V_p'$, and $\Delta V_1$ is just the pixel voltage compensation value in the region 1.

It should be appreciated that, in some other embodiments of the present disclosure, the pixel voltage compensation value and the common voltage compensation value in each adjustment region may be obtained in other ways.

In the related art, the region-based compensation is performed through querying a table in accordance with RGB grayscale values of an inputted image. The compensation is performed in accordance with a theoretical value, and it is digital compensation in most cases, so the compensation effect is not obvious. Due to uneven charging, the $V_{com}$ deviation occurs at some regions, leading to uneven brightness.

In order to further solve this problem, in the brightness adjustment method in the embodiments of the present disclosure, an actual brightness value may be detected through a light-sensitive sensor, and then the voltage compensation is performed in a more accurate manner in accordance with the actual brightness value obtained by the light-sensitive sensor. In this way, it is able to prevent the occurrence of after images due to the uneven charging, thereby to ensure the even brightness in any environments.

For example, prior to Step S01, the brightness adjustment method further includes: S01' of detecting ambient brightness values at different positions in the currently displaying image; S02' of querying a pre-stored look-up table to determine voltage compensation values at different positions, the look-up table including a correspondence between the ambient brightness values and the voltage compensation values; and S03' of determining the distribution states of the common voltages $V_{com}$ and the pixel voltages $V_{pixel}$ in the currently displaying image in accordance with a correspondence between the voltage compensation values at different positions in the currently displaying image and corresponding positions.

It should be appreciated that, the change in the common voltages and the change in the pixel voltages are determined in accordance with the correspondence between the voltage compensation values and the positions.

Based on the above, the detection of the ambient brightness value is combined with the gamma adjustment of the display module. Especially for a large-size display product, its brightness is adjusted adaptively in accordance with an environment condition, and the adaptive brightness adjustment is combined with the region-based compensation for balancing the brightness of the entire display module. The ambient brightness value in each region is detected by the light-sensitive sensor, and a difference between the ambient brightness values in the regions is calculated. When the brightness unevenness occurs due to a voltage drop in each region, the voltage compensation data is determined through querying the look-up table, and then the voltage distribution states of the common voltages $V_{com}$ and the pixel voltages $V_{pixel}$ are determined in accordance with the voltage compensation data. In other words, the voltage compensation is performed in a more accurate manner in accordance with an actual brightness value detected by the light-sensitive sensor.

It should be further appreciated that, prior to Step S01', the brightness adjustment method further includes obtaining the look-up table. The obtaining the look-up table is performed at a testing stage of the display product, and it specifically includes: S01" of detecting ambient brightness values at different positions in a test image; S02" of calculating an average value of the ambient brightness values of the test image as a brightness reference; and S03" of calculating a difference between the ambient brightness value at each position in the test image and the brightness reference, and determining a voltage compensation value corresponding to each ambient brightness value in accordance with the difference, so as to obtain the look-up table.

Based on the above, the ambient brightness value at each point is reported in accordance with a function of the light-sensitive sensor, the average value of the ambient brightness values is calculated as the brightness reference, and the difference between the ambient brightness value at each position and the brightness reference is calculated, and then the compensation is performed through querying the look-up table. In this way, it is able to determine the brightness values of a panel, and then perform the voltage compensation through calling the look-up table in accordance with a voltage compensation algorithm.

In addition, in some embodiments of the present disclosure, in the brightness adjustment method, the ambient brightness value is detected by the light-sensitive sensor at the testing stage and a gamma adjustment stage.

The light-sensitive sensor may be integrated in the display module. In order to prevent the display from being adversely affected by the light-sensitive sensor, the light-sensitive sensor may not arranged at a center of the display module. Hence, the detecting the ambient brightness values through the light-sensitive sensors specifically includes the following steps.

At the testing stage, the test image is divided into a plurality of sub-regions arranged in an array of L rows and D columns, where each of L and D is a positive integer greater than or equal to 1. Then, the light-sensitive sensors are provided in the sub-regions in a first row, the sub-regions in an $L^{th}$ row, the sub-regions in a first column and the sub-regions in a $D^{th}$ column in the plurality of sub-regions so as to obtain the ambient brightness values at different positions in the test image, wherein the first row, the $L^{th}$ row, the first column, and the $D^{th}$ column being at a periphery of the array.

At the gamma adjustment stage, the currently displaying image is divided into a plurality of sub-regions arranged in an array of L rows and D columns, where each of L and D is a positive integer greater than or equal to 1. Then, the light-sensitive sensors are provided in the sub-regions in a first row, the sub-regions in an $L^{th}$ row, the sub-regions in a first column and the sub-regions in a $D^{th}$ column in the plurality of sub-regions so as to obtain the ambient brightness values at different positions in the currently displaying image, wherein the first row, the $L^{th}$ row, the first column, and the $D^{th}$ column being at a periphery of the array.

At the testing stage, through detecting the ambient brightness values, it is able to obtain the look-up table (LUT) in accordance with a testing result (brightness values). The look-up table includes a relationship between the ambient brightness values and the voltage compensation values. In other words, the look-up table includes the voltage compensation value corresponding to each brightness difference.

It should be appreciated that, the quantity of sub-regions will not be particularly defined herein, i.e., the quantity of sub-regions may be adjusted in accordance with actual testing data of the product.

Figure 5:
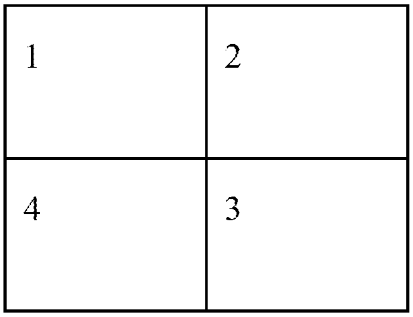
FIG. 5 is a schematic view showing the arrangement of the light-sensitive sensors in a medium and small-size display module according to some embodiments of the present disclosure.
Figure 6:
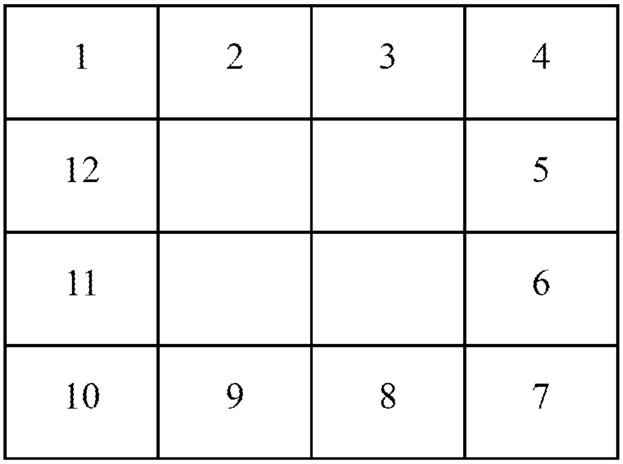
FIG. 6 is a schematic view showing the arrangement of the light-sensitive sensors in a medium-size display module according to some embodiments of the present disclosure.

For example, for a small-size display module in FIG. 4, merely two sub-regions 1 and 2 are provided, and a light-sensitive sensor is arranged in each sub-region. For a medium and small-size display module in FIG. 5, four sub-regions 1, 2, 3 and 4 are provided, and a light-sensitive sensor is arranged in each sub-region. For a medium-size display module in FIG. 6, sub-regions are arranged in four rows and four columns, and a light-sensitive sensor is arranged in each of the peripheral sub-regions (i.e., sub-regions 1 to 12 in FIG. 6). For a large-size display module in FIG. 7, sub-regions are arranged in eleven rows and seven columns, and a light-sensitive sensor is arranged in each of the peripheral sub-regions (i.e., sub-regions 1 to 32 in FIG. 7).

It should be appreciated that, the above description about the detection of the ambient brightness values is merely for illustrative purposes, and in actual use, it is not limited thereto.

The present disclosure further provides in some embodiments a brightness adjustment device, which includes: a first division module configured to divide a currently displaying image into M first regions in accordance with a distribution state of common voltages N, in the currently displaying image, a difference between the common voltages $V_{com}$ in different first regions being greater than a first threshold, M being an integer greater than 1; a second division module configured to divide the currently displaying image into N second regions in accordance with a distribution state of pixel voltages $V_{pixel}$ in the currently displaying image, a difference between the pixel voltages $V_{pixel}$ in different second regions being greater than a second threshold, N being an integer greater than 1; a first calculation module configured to calculate a voltage compensation value in each first region, a voltage compensation value in an in first region being $\Delta V_m$, m being an integer within a range of 1 to M; a second calculation module configured to calculate a voltage compensation value in each second region, a voltage compensation value in an $n^{th}$ second region being $\Delta V_n$, n being an integer within a range of 1 to N; a third division module configured to overlap the M first regions and the N second regions to obtain M*N adjustment regions; a third calculation module configured to calculate gamma voltages at different grayscales in each adjustment region to obtain a set of gamma data about the M*N adjustment regions, a gamma voltage in an adjustment region obtained through overlapping the $m^{th}$ first region and the n, second region being $V+\Delta V_m+\Delta V_n$, V being a grayscale voltage at a current grayscale; and a driving module configured to drive a display module to display in accordance with the gamma data.

In a possible embodiment of the present disclosure, the brightness adjustment device further includes: light-sensitive sensors configured to detect ambient brightness values at different positions in the currently displaying image; a querying module configured to query a pre-stored look-up table to determine voltage compensation values at different positions, the look-up table including a correspondence between the ambient brightness values and the voltage compensation values; and a determination module configured to determine the distribution states of the common voltages $V_{com}$ and the pixel voltages $V_{pixel}$ in the currently displaying image in accordance with a correspondence between the voltage compensation values at different positions in the currently displaying image and corresponding positions.

In a possible embodiment of the present disclosure, the brightness adjustment device further includes an obtaining module configured to obtain the correspondence. The obtaining module specifically includes: a reception unit configured to detect ambient brightness values at different positions in a test image; a first calculation unit configured to calculate an average value of the ambient brightness values of the test image as a brightness reference; a second calculation unit configured to calculate a difference between the ambient brightness value at each position in the test image and the brightness reference; and a data processing unit configured to determine a voltage compensation value corresponding to each ambient brightness value in accordance with the difference, so as to obtain the look-up table.

In a possible embodiment of the present disclosure, the light-sensitive sensor is integrated in the display module, an image displayed by the display module is divided into a plurality of sub-regions arranged in an array of L rows and D columns, each of L and D is a positive integer greater than or equal to 1. The light-sensitive sensors are provided in the sub-regions in a first row, the sub-regions in an $L^{th}$ row, the sub-regions in a first column and the sub-regions in a $D^{th}$ column in the plurality of sub-regions, wherein the first row, the $L^{th}$ row, the first column, and the $D^{th}$ column being at a periphery of the array.

In a possible embodiment of the present disclosure, the first calculation module is specifically configured to calculate the voltage compensation value $\Delta V_m$ in the $m^{th}$ first region through $\Delta V_m=V_m-V_p$ (I), where $V_p$ represents an average value of the common voltages $V_{com}$ in the M first regions, and $V_m$ represents a value of the common voltage $V_{com}$ in the $m^{th}$ first region.

In a possible embodiment of the present disclosure, the second calculation module is specifically configured to calculate the voltage compensation value $\Delta V_n$ in the $n^{th}$ second region through $\Delta V_n=V_n-V_p'$ (II), where $V_p'$ represents an average value of the pixel voltages $V_{pixel}$ in the N second regions, and $V_n$ represents a value of the pixel voltage $V_{pixel}$ in the $n^{th}$ second region.

Obviously, the brightness adjustment device in the embodiments of the present disclosure also has the beneficial effects of the above-mentioned brightness adjustment method, which will thus not be particularly defined herein.

The present disclosure further provides in some embodiments a display device, which includes the above-mentioned brightness adjustment device. Obviously, the display device in the embodiments of the present disclosure also has the beneficial effects of the above-mentioned brightness adjustment method, which will thus not be particularly defined herein.

Some description will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be overlapped to acquire new embodiments.

The above embodiments are for illustrative purposes only, but the present disclosure is not limited thereto. A protection scope of the present disclosure is defined by the attached claims.

What is claimed is:

1. A brightness adjustment method, comprising:

dividing a currently displaying image into M first regions in accordance with a distribution state of common voltages $V_{com}$ in the currently displaying image, a difference between the common voltages $V_{com}$ in different first regions being greater than a first threshold, M being an integer greater than 1; wherein the distribution state of the common voltages $V_{com}$ is a change state of the common voltages $V_{com}$;

dividing the currently displaying image into N second regions in accordance with a distribution state of pixel voltages $V_{pixel}$ in the currently displaying image, a difference between the pixel voltages $V_{pixel}$ in different second regions being greater than a second threshold, N being an integer greater than 1; wherein the distribution of the pixel voltages $V_{pixel}$ is a charging change in the pixel voltages $V_{pixel}$;

calculating a voltage compensation value in each of the first regions, a voltage compensation value in an $m^{th}$ first region being $\Delta V_m$, m being an integer within a range of 1 to M;

calculating a voltage compensation value in each of the second regions, a voltage compensation value in an $n^{th}$ second region being $\Delta V_n$, n being an integer within a range of 1 to N;

overlapping the M first regions and the N second regions to obtain M*N adjustment regions;

calculating gamma voltages at different grayscales in each of the adjustment regions to obtain a set of gamma data about the M*N adjustment regions, a gamma voltage in the adjustment region obtained through overlapping the $m^{th}$ first region and the $n^{th}$ second region being $V+\Delta V_m+\Delta V_n$, V being a grayscale voltage at a current grayscale;

driving a display module to display in accordance with the gamma data;

wherein the common voltage compensation value $\Delta V_m$ in the $m^{th}$ first region is calculated through a following formula (I):

$$\Delta V_m = V_m - V_p, \quad \text{(I)}$$

where $V_p$ represents an average value of the common voltages $V_{com}$ in the M first regions, and $V_m$ represents a value of the common voltage $V_{com}$ in the $m^{th}$ first region.

2. The brightness adjustment method according to claim 1, wherein the pixel voltage compensation value $\Delta V_n$ in the $n^{th}$ second region is calculated through a following formula (II):

$$\Delta V_n = V_n - V_p', \quad \text{(II)}$$

where $V_p'$ represents an average value of the pixel voltages $V_{pixel}$ in the N second regions, and $V_n$ represents a value of the pixel voltage $V_{pixel}$ in the $n^{th}$ second region.

3. The brightness adjustment method according to claim 1, wherein prior to dividing the currently displaying image into the M first regions in accordance with the distribution state of the common voltages $V_{com}$ in the currently displaying image, the brightness adjustment method further comprises:

detecting ambient brightness values at different positions in the currently displaying image;

querying a pre-stored look-up table to determine voltage compensation values at the different positions, the look-up table comprising a correspondence between the ambient brightness values and the voltage compensation values;

determining the distribution states of the common voltages $V_{com}$ and the pixel voltages $V_{pixel}$ in the currently displaying image in accordance with a correspondence between the voltage compensation values at the different positions in the currently displaying image and corresponding positions.

4. The brightness adjustment method according to claim 3, wherein prior to querying the pre-stored look-up table, the brightness adjustment method further comprises obtaining the look-up table, wherein the obtaining the look-up table comprises:

detecting ambient brightness values at different positions in a test image;

calculating an average value of the ambient brightness values of the test image as a brightness reference; and calculating a difference between the ambient brightness value at each of the different positions in the test image and the brightness reference, and determining a voltage compensation value corresponding to each of the ambient brightness values in accordance with the difference, to obtain the look-up table.

5. The brightness adjustment method according to claim 4, wherein the detecting the ambient brightness values at the different positions in the test image comprises:

dividing the test image into a plurality of sub-regions arranged in an array of L rows and D columns, L and D each being a positive integer greater than or equal to 1;

providing light-sensitive sensors in the sub-regions in a first row, the sub-regions in an $L^{th}$ row, the sub-regions in a first column and the sub-regions in a $D^{th}$ column in the plurality of sub-regions arranged in the array of L rows and D columns, to obtain the ambient brightness values at the different positions in the test image, wherein the first row, the $L^{th}$ row, the first column, and the $D^{th}$ column being at a periphery of the array;

and/or the detecting the ambient brightness values at the different positions in the currently displaying image comprises:

dividing the currently displaying image into a plurality of sub-regions arranged in an array of L rows and D columns, L and D each being a positive integer greater than or equal to 1;

providing light-sensitive sensors in the sub-regions in a first row, the sub-regions in an $L^{th}$ row, the sub-regions in a first column and the sub-regions in a $D^{th}$ column in the plurality of sub-regions arranged in the array of L rows and D columns, to obtain the ambient brightness values at the different positions in the currently displaying image, wherein the first row, the $L^{th}$ row, the first column, and the $D^{th}$ column being at a periphery of the array.

6. A brightness adjustment device, comprising:

a first division circuit configured to divide a currently displaying image into M first regions in accordance with a distribution state of common voltages $V_{com}$ in the currently displaying image, a difference between the common voltages $V_{com}$ in different first regions being greater than a first threshold, M being an integer greater than 1; wherein the distribution state of the common voltages $V_{com}$ is a change state of the common voltages $V_{com}$;

a second division circuit configured to divide the currently displaying image into N second regions in accordance with a distribution state of pixel voltages $V_{pixel}$ in the currently displaying image, a difference between the pixel voltages $V_{pixel}$ in different second regions being greater than a second threshold, N being an integer greater than 1; wherein the distribution of the pixel voltages $V_{pixel}$ is a charging change in the pixel voltages $V_{pixel}$;

a first calculation circuit configured to calculate a voltage compensation value in each of the first regions, a voltage compensation value in an $m^{th}$ first region being $\Delta V_m$, m being an integer within a range of 1 to M;

a second calculation circuit configured to calculate a voltage compensation value in each of the second regions, a voltage compensation value in an $n^{th}$ second region being $\Delta V_n$, n being an integer within a range of 1 to N;

a third division circuit configured to overlap the M first regions and the N second regions to obtain M*N adjustment regions;

a third calculation circuit configured to calculate gamma voltages at different grayscales in each of the adjustment regions to obtain a set of gamma data about the M*N adjustment regions, a gamma voltage in the adjustment region obtained through overlapping the $m^{th}$ first region and the $n^{th}$ second region being $V+\Delta V_m+\Delta V_n$, V being a grayscale voltage at a current grayscale;

a driving calculation circuit configured to drive a display module to display in accordance with the gamma data;

wherein the first calculation circuit is specifically configured to calculate the common voltage compensation value $\Delta V_m$ in the $m^{th}$ first region through a following formula (I):

$$\Delta V_m = V_m - V_p, \tag{I}$$

where $V_p$ represents an average value of the common voltages $V_{com}$ in the M first regions, and $V_m$ represents a value of the common voltage $V_{com}$ in the $m^{th}$ first region.

7. The brightness adjustment device according to claim 6, wherein the second calculation circuit is specifically configured to calculate the pixel voltage compensation value $\Delta V_n$ in the $n^{th}$ second region through a following formula (II):

$$\Delta V_n = V_n - V'_p, \tag{II}$$

where $V_p'$ represents an average value of the pixel voltages $V_{pixel}$ in the N second regions, and $V_n$ represents a value of the pixel voltage $V_{pixel}$ in the $n^{th}$ second region.

8. The brightness adjustment device according to claim 6, further comprising:

light-sensitive sensors configured to detect ambient brightness values at different positions in the currently displaying image;

a querying circuit configured to query a pre-stored look-up table to determine voltage compensation values at different positions, the look-up table comprising a correspondence between the ambient brightness values and the voltage compensation values; a determination circuit configured to determine the distribution states of the common voltages $V_{com}$ and the pixel voltages $V_{pixel}$ in the currently displaying image in accordance with a correspondence between the voltage compensation values at the different positions in the currently displaying image and corresponding positions.

9. The brightness adjustment device according to claim 8, further comprising an obtaining circuit configured to obtain the correspondence, the obtaining circuit specifically comprises:

a reception sub-circuit configured to detect ambient brightness values at different positions in a test image;

a first calculation sub-circuit configured to calculate an average value of the ambient brightness values of the test image as a brightness reference;

a second calculation sub-circuit configured to calculate a difference between the ambient brightness value at each of the different positions in the test image and the brightness reference; and a data processing sub-circuit configured to determine a voltage compensation value corresponding to each of the ambient brightness values in accordance with the difference, to obtain the look-up table.

10. The brightness adjustment device according to claim 8, wherein the light-sensitive sensors are integrated in the display module, an image displayed by the display module is divided into a plurality of sub-regions arranged in an array of L rows and D columns, and each of L and D is a positive integer greater than or equal to 1, wherein the light-sensitive sensors are provided in the sub-regions in a first row, the sub-regions in an $L^{th}$ row, the sub-regions in a first column and the sub-regions in a $D^{th}$ column in the plurality of sub-regions arranged in the array of L rows and D columns, wherein the first row, the $L^{th}$ row, the first column, and the $D^{th}$ column are at a periphery of the array.

11. A display device, comprising the brightness adjustment device according to claim 6.

12. The display device according to claim 11, wherein the second calculation circuit is specifically configured to calculate the pixel voltage compensation value $\Delta V_n$ in the $n^{th}$ second region through a following formula (II):

$$\Delta V_n = V_n - V'_p, \quad \text{(II)}$$

where $V_p'$ represents an average value of the pixel voltages $V_{pixel}$ in the N second regions, and $V_n$ represents a value of the pixel voltage $V_{pixel}$ in the $n^{th}$ second region.

13. The display device according to claim 11, wherein the brightness adjustment device further comprises:

light-sensitive sensors configured to detect ambient brightness values at different positions in the currently displaying image;

a querying circuit configured to query a pre-stored look-up table to determine voltage compensation values at different positions, the look-up table comprising a correspondence between the ambient brightness values and the voltage compensation values; a determination circuit configured to determine the distribution states of the common voltages $V_{com}$ and the pixel voltages $V_{pixel}$ in the currently displaying image in accordance with a correspondence between the voltage compensation values at the different positions in the currently displaying image and corresponding positions.

14. The display device according to claim 13, wherein the brightness adjustment device further comprises an obtaining circuit configured to obtain the correspondence, wherein the obtaining circuit specifically comprises:

a reception sub-circuit configured to detect ambient brightness values at different positions in a test image;

a first calculation sub-circuit configured to calculate an average value of the ambient brightness values of the test image as a brightness reference;

a second calculation sub-circuit configured to calculate a difference between the ambient brightness value at each of the different positions in the test image and the brightness reference; and a data processing sub-circuit configured to determine a voltage compensation value corresponding to each of the ambient brightness values in accordance with the difference, to obtain the look-up table.

15. The display device according to claim 13, wherein the light-sensitive sensors are integrated in the display module, an image displayed by the display module is divided into a plurality of sub-regions arranged in an array of L rows and D columns, and each of L and D is a positive integer greater than or equal to 1, wherein the light-sensitive sensors are provided in the sub-regions in a first row, the sub-regions in an $L^{th}$ row, the sub-regions in a first column and the sub-regions in a $D^{th}$ column in the plurality of sub-regions arranged in the array of L rows and D columns, wherein the first row, the $L^{th}$ row, the first column, and the $D^{th}$ column are at a periphery of the array.

* * * * *